US009852204B2

(12) United States Patent
Bolosky et al.

(10) Patent No.: US 9,852,204 B2
(45) Date of Patent: *Dec. 26, 2017

(54) READ-ONLY OPERATIONS PROCESSING IN A PAXOS REPLICATION SYSTEM

(71) Applicant: Microsoft Technology Licensing, LLC, Redmond, WA (US)

(72) Inventors: William J. Bolosky, Issaquah, WA (US); Randolph B. Haagens, Bellevue, WA (US); Norbert P. Kusters, Redmond, WA (US); Peng Li, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/195,495

(22) Filed: Mar. 3, 2014

(65) Prior Publication Data

US 2014/0181026 A1 Jun. 26, 2014

Related U.S. Application Data

(63) Continuation of application No. 13/051,964, filed on Mar. 18, 2011, now Pat. No. 8,694,647.

(51) Int. Cl.
*G06F 15/16* (2006.01)
*G06F 17/30* (2006.01)
(Continued)

(52) U.S. Cl.
CPC ...... *G06F 17/30581* (2013.01); *G06F 9/5038* (2013.01); *H04L 67/1008* (2013.01)

(58) Field of Classification Search
CPC ............ H04L 67/1008; H04L 67/1095; G06F 17/30581; G06F 17/30212
(Continued)

(56) References Cited

U.S. PATENT DOCUMENTS 5,165,031 A 11/1992 Pruul et al.
5,363,505 A 11/1994 Masaik et al.
(Continued)

OTHER PUBLICATIONS

Baker, Jason, et al., "Megastore: Providing Scalable, Highly Available Storage for Interactive Services", Jan. 9-12, 2011, pp. 223-234.
(Continued)

*Primary Examiner* — Kevin Bates
*Assistant Examiner* — Clarence D McCray
(74) *Attorney, Agent, or Firm* — Workman Nydegger

(57) ABSTRACT

Embodiments are directed to processing read-only operations without storing the operations persistently, determining a processing order for read-only requests, and to directing read-only requests to nodes best able to handle the requests. In an embodiment, a quorum leader receives various read-only requests. The quorum leader controls process ordering for replicas in the leader's quorum. The quorum leader determines an appropriate order for processing the read-only operations, without clock-based synchronization. The quorum leader sends the read-only request to an appropriate replica in the quorum and executes the read-only request at the appropriate replica without storing the operation persistently.

18 Claims, 4 Drawing Sheets

(51) Int. Cl.
*G06F 9/50* (2006.01)
*H04L 29/08* (2006.01)

(58) Field of Classification Search
USPC .......................................................... 709/227
See application file for complete search history.

(56) References Cited

U.S. PATENT DOCUMENTS

| | | | | |
|---|---|---|---|---|
| 6,463,532 | B1* | 10/2002 | Reuter et al. | 709/224 |
| 7,113,980 | B2* | 9/2006 | Jacobs et al. | 709/217 |
| 7,171,491 | B1 | 1/2007 | O'Toole et al. | |
| 7,249,280 | B2* | 7/2007 | Lamport et al. | 714/11 |
| 7,334,154 | B2* | 2/2008 | Lorch et al. | 714/4.4 |
| 7,454,521 | B2* | 11/2008 | Howell et al. | 709/238 |
| 7,555,516 | B2* | 6/2009 | Lamport | 709/201 |
| 7,558,883 | B1* | 7/2009 | Lamport | 709/248 |
| 7,565,433 | B1* | 7/2009 | Lamport | 709/227 |
| 7,620,680 | B1* | 11/2009 | Lamport | 709/201 |
| 7,627,694 | B2* | 12/2009 | Sreenivasan | H04L 69/40 709/249 |
| 7,698,465 | B2* | 4/2010 | Lamport | 709/245 |
| 7,711,825 | B2* | 5/2010 | Lamport | 709/227 |
| 7,849,223 | B2* | 12/2010 | Malkhi et al. | 709/248 |
| 7,856,502 | B2* | 12/2010 | Lamport et al. | 709/227 |
| 7,877,552 | B2 | 1/2011 | Leveille et al. | |
| 7,971,030 | B2 | 6/2011 | O'Sullivan | |
| 8,005,888 | B2* | 8/2011 | Lamport | 709/201 |
| 8,046,413 | B2* | 10/2011 | Howell et al. | 709/205 |
| 8,301,589 | B2 | 10/2012 | Sen et al. | |
| 8,478,888 | B2* | 7/2013 | Sangra et al. | 709/229 |
| 8,589,574 | B1* | 11/2013 | Cormie et al. | 709/230 |
| 8,745,126 | B2* | 6/2014 | Watanabe | 709/202 |
| 8,775,500 | B2* | 7/2014 | Watanabe | 709/202 |
| 9,021,296 | B1* | 4/2015 | Kiselev et al. | 714/6.23 |
| 9,223,686 | B1* | 12/2015 | Gupta | G06F 12/00 |
| 2002/0035559 | A1* | 3/2002 | Crowe et al. | 707/2 |
| 2002/0156719 | A1 | 10/2002 | Finebaum et al. | |
| 2005/0160226 | A1* | 7/2005 | Averill | G06F 12/0817 711/133 |
| 2005/0283644 | A1* | 12/2005 | Lorch | G06F 11/187 714/4.4 |
| 2006/0136781 | A1* | 6/2006 | Lamport | G06F 11/1482 714/25 |
| 2006/0168011 | A1* | 7/2006 | Lamport | G06F 11/1494 709/206 |
| 2006/0248017 | A1 | 11/2006 | Koka et al. | |
| 2006/0286530 | A1* | 12/2006 | Forrest | G09B 7/02 434/323 |
| 2008/0071853 | A1* | 3/2008 | Mosier et al. | 709/201 |
| 2008/0071878 | A1* | 3/2008 | Reuter | 709/208 |
| 2008/0320247 | A1 | 12/2008 | Morfey et al. | |
| 2009/0119304 | A1 | 5/2009 | Preslan et al. | |
| 2009/0150566 | A1* | 6/2009 | Malkhi | H04L 67/34 709/242 |
| 2009/0216910 | A1 | 8/2009 | Duchesneau | |
| 2010/0329174 | A1* | 12/2010 | Shuey | G01D 1/00 370/315 |
| 2011/0047202 | A1* | 2/2011 | Ellison et al. | 709/201 |
| 2012/0089861 | A1* | 4/2012 | Cardinell et al. | 714/2 |
| 2012/0254342 | A1* | 10/2012 | Evans | G06F 11/186 709/214 |
| 2012/0254412 | A1* | 10/2012 | Goose | G06F 9/5072 709/224 |
| 2016/0077936 | A1* | 3/2016 | Tang | G06F 11/2028 714/4.11 |

OTHER PUBLICATIONS

Rao, Jun, et al., "Using Paxos to Build a Scalable, Consistent, and Highly Available Datastore", Available at least as early as Mar. 2011, pp. 243-254.
Lamport, Leslie, et al., "Vertical paxos and Primary-Backup Replication", Available at least as early as Mar. 3, 2011, 2 pages.
Mao, Yanhua, et al., "Mencius: Building Efficient Replicated State Machines for WANs", Available at least as early as Mar. 3, 2011, 16 pages.
Mazi'Eres, David, "Paxos Made Practical", Available at least as early as Mar. 1, 2011, 11 pages.
Vieira, Gustavo, M. D., et al., "The Performance of Paxos and Fast Paxos", Available at least as early as Mar. 1, 2011, 14 pages.
Abd-El-Malek, Michael, et al., "Fault-scalable Byzantine Fault-tolerant Services" Oct. 23-26, 2005, 16 pages. Available at <<http://www.pds.cmu.edu/PDL-FTP/PASIS/sosp05.pdf>>.
Adya, Atul, et al., FARSITE: Federated, Available, and Reliable Storage for an Incompletely Trusted Environment, Dec. 2002, 14 pages. Available at <<http://citeseerx.ist.psu.edu/viewdoc/download;jsessionid=3FB77E5E0257A7890F268D09973CE4AF?doi=10.1.1.11.3814&rep=rep1&type=pdf>>.
Anderson, Thomas E., et al., "Serverless Network File Systems", Dec. 1995, 21 pages. Available at <<http://citeseerx.ist.psu.edu/viewdoc/download?doi=10.1.1.80.5867&rep=rep1&type=pdf>>.
Bairavasundaram, Lakshmi N., et al., "An Analysis of Data Corruption in the Storage Stack", Jan. 8, 2008, 16 pages. Available at <<http://www.pdsi-scidac.org/publications/papers/schroeder-fast08.pdf>>.
Burrow, Mike, "The Chubby Lock Service for Loosely-coupled Distributed Systems", Apr. 24, 2006, 14 pages. Available at <<http://www.eecs.harvard.edu/cs262/Readings/chubby.pdf>>.
Candea, George, et al., "Crash-Only Software", May 2003, 6 pages. <<http://www.google.co.uk/url?sa=t&source=web&cd=5&ved=0CD0QFjAE&url=http%3A%2F%2Fciteseerx.ist.psu.edu%2Fviewdoc%2Fdownload%3Fdoi%3D10.1.1.90.9585%26rep%3Drep1%26type%3Dpdf&ei=KMpsTZONHKed4AaC3PW5BA&usg=AFQjCNEIGvFVdOhk-4-3MMk2LrzMXjXrww>>.
Candea, George, et al., "Microreboot—A Technique for Cheap Recovery", OSDI'04: 6th Symposium on Operating Systems and Design and Implementation, pp. 31-44. Available at <<http://www.usenix.org/event/osdi04/tech/full_papers/candea/candea.pdf>>.
Cao, Pei , et al., "The TickerTAIP Parallel RAID Architecture,", Nov. 1992, 22 pages. Available at <<http://www.hpl.hp.com/techreports/92/HPL-92-151.pdf>>.
Castro, Miguel, et al., "Practical Byzantine Fault Tolerance", Feb. 1999, 14 pages. Available at <<http://www.pmg.csail.mit.edu/papers/osdi99.pdf>>.
Chandra, Tushar, et al., "Paxos Made Live: An Engineering Perspective", Jun. 26, 2007, 16 pages. Available at <<http://citeseerx.ist.psu.edu/viewdoc/download?doi=10.1.1.116.9219&rep=rep1&type=pdf>>.
Cowling, James, et al., "HQ Replication: A Hybrid Quorum Protocol for Byzantine Fault Tolerance", Nov. 2006, 14 pages. Available at <<http://people.csail.mit.edu/cowling/hq/hq-osdi06.pdf.>>.
Douceur, John, R., et al., "Distributed Directory Service in the Farsite File System", OSDI '06: 7th USENIX Symposium on Operating Systems Design and Implementation, Nov. 2006, 14 pages. Available at <<http://citeseerx.ist.psu.edu/viewdoc/download?doi=10.1.1.100.9933&rep=rep1&type=pdf>>.
Ghemawat, Sanjay, et al., "The Google File System", Oct. 19-22, 2003, 15 pages. Available at <<http://citeseerx.ist.psu.edu/viewdoc/download?doi=10.1.1.125.789&rep=rep1&type=pdf>>.
Hartman, John Henry, "The Zebra Striped Network File System", 1994, 159 pages. (The month of Publication is irrelevant since the year of Publication is clearly prior to the filing of the Application) Available at <<http://citeseerx.ist.psu.edu/viewdoc/download?doi=10.1.1.49.467&rep=rep1&type=pdf>>.
Howard, John H., et al., "Scale and Performance in a Distributed File System", Feb. 1988, 31 pages. Available at <<http://citeseerx.ist.psu.edu/viewdoc/download?doi=10.1.1.71.5072&rep=rep1&type=pdf>>.
Katcher, Jeffrey, "Postmark: A New File System Benchmark", Oct. 8, 1997, 8 pages. Available at <<http://communities-staging.netapp.com/servlet/JiveServlet/download/2609-1551/Katcher97-postmark-netapp-tr3022.pdf>>.
Kotla, Ramakrishna, et al., "Zyzzyva: Speculative Byzantine Fault Tolerance", Oct. 14-17, 2007, 15 pages. Available at <<http://citeseerx.ist.psu.edu/viewdoc/download?doi=10.1.1.122.112&rep=rep1&type=pdf>>.

(56) References Cited

OTHER PUBLICATIONS

Kubiatowicz, John, et al., "OceanStore: An Architecture for Global-scale Persistent Storage", Nov. 2000, 12 pages. Available at <<http://citeseerx.ist.psu.edu/viewdoc/download?doi=10.1.1.38.1044&rep=rep1&type=pdf>>.
Lamport, Leslie, "The Part-time Parliament", May 1998, 33 pages. Available at <<http://research.microsoft.com/en-us/um/people/lamport/pubs/lamport-paxos.pdf>>.
Lamport, Leslie, "Paxos Made Simple", Nov. 1, 2001, 14 pages. Available at <<http://citeseerx.ist.psu.edu/viewdoc/download?doi=10.1.1.69.3093&rep=rep1&type=pdf>>.
Lamport, Leslie, et al., "The Byzantine Generals Problem", Jul. 1982, 20 pages. Available at <<http://citeseerx.ist.psu.edu/viewdoc/download?doi=10.1.1.12.1697&rep=rep1&type=pdf>>.
Lampson, Butler W., "The ABCD's of Paxos", 2001 Principles of Distributed Computing Conference, Aug. 2001, 17 pages. Available at <<http://citeseerx.ist.psu.edu/viewdoc/download?doi=10.1.1.67.80&rep=rep1&type=pdf>>.
Lee, Edward K., et al., "Petal: Distributed Virtual Disks", 1996, 9 pages. (The month of Publication is irrelevant since the year of Publication is clearly prior to the filing of the Application) Available at <<http://citeseerx.ist.psu.edu/viewdoc/download?doi=10.1.1.122.8832&rep=rep1&type=pdf>>.
Lorch, Jacob R., et al., "The SMART Way to Migrate Replicated Stateful Services", Apr. 18-21, 2006, 13 pages. Available at <<http://citeseerx.ist.psu.edu/viewdoc/download?doi=10.1.1.73.1298&rep=rep1&type=pdf>>.
MacCormick, John, et al., "Boxwood: Abstractions as the Foundation for Storage Infrastructure", OSDI '04: 6th Symposium on Operating Systems Design and Implementation, 16 pages. (The month of Publication is irrelevant since the year of Publication is clearly prior to the filing of the Application) Available at <<http://citeseerx.ist.psu.edu/viewdoc/download?doi=10.1.1.134.8940&rep=rep1&type=pdf>>.
Narayanan, Dushyanth, et al., "Everest: Scaling Down Peak Loads through I/O Off-loading", Proceedings of 8th USENIX Symposium on Operating Systems Design and Implementation (OSDI '08), Dec. 2008, 22 pages. Available at <<http://www.usenix.org/event/osdi08/tech/full_papers/narayanan/narayanan_html/>>.
Nightingale, Edmund B., et al., "Cycles, Cells and Platters: An empirical analysis of hardware failures on a million commodity PCs", Apr. 10-13, 2011, 14 pages. Available at <<http://research.microsoft.com/pubs/144888/eurosys84-nightingale.pdf>>.
Oki, Brian Masao, "Viewstamped Replication for Highly Available Distributed Systems", Aug. 1988, 103 pages. Available at <<http://publications.csail.mit.edu/lcs/pubs/pdf/MIT-LCS-TR-423.pdf>>.
Rosenblum, Mendel, et al., "The Design and Implementation of a Log-structured File System", Feb. 1992, 27 pages. Available at <<http://www.cs.toronto.edu/~demke/469F.06/Handouts/p26-rosenblum.pdf>>.
Reummier, Chris, et al., "An Introduction to Disk Drive Modeling", Mar. 17-29, 1994, 19 pages. Available at <<http://citeseerx.ist.psu.edu/viewdoc/download;jsessionid=557F2E04B535AAF9B42FE6E662C71351?doi=10.1.1.117.39&rep=rep1&type=pdf>>.
Saito, Yasushi, et al., "FAB: Building Distributed Enterprise Disk Arrays from Commodity Components", Oct. 7-13, 2004, 11 pages. Available at <<http://citeseerx.ist.psu.edu/viewdoc/download?doi=10.1.1.1.2631&rep=rep1&type=pdf>>.
"Implementing Fault-tolerant Services using the State Machine Approach: A Tutorial", Dec. 1990, 21 pages. Available at <<http://citeseerx.ist.psu.edu/viewdoc/download?doi=10.1.1.69.1536&rep=rep1&type=pdf>>.
Schroeder, Bianca, et al., "DRAM Errors in the Wild: A Large-scale Field Study", Jun. 15-19, 2009, 12 pages. Available at <<http://citeseerx.ist.psu.edu/viewdoc/download?doi=10.1.1.148.9610&rep=rep1&type=pdf>>.
"SCSI Primary Commands—3 (SPC-3)", May 4, 2005, 496 pages. Available at <<http://www.13thmonkey.org/documentation/SCSI/spc3r23.pdf>>.
Thekkath, Chandramohan A., et al., "Frangipani: A Scalable Distributed File System", Proceedings of the 16th ACM Symposium on Operating Systems Principles, Dec. 1997, 14 pages. Available at <<http://citeseerix.ist.psu.edu/viewdoc/download?doi=10.1.1.41.3241&rep=rep1&type=pdf>>.
Tomasulo, R.M., "An Efficient Algorithm for Exploiting Multiple Arithmetic Units", IBM Journal, Jan. 1967, 9 pages. Available at <<http://citeseerx.ist.psu.edu/viewdoc/download?doi=10.1.1.129.4915&rep=rep1&type=pdf>>.
Traeger, Avishay, et al., "A Nine Year Study of File System and Storage Benchmarking", Received May 2007; revised Nov. 2007; accepted Nov. 2007, ACM Transactions on Storage, vol. 4, No. 2, Article 5, Publication date: May 2008, 51 pages. Available at <<http://citeseerx.ist.psu.edu/viewdoc/download?doi=10.1.1.77.4042&rep=rep1&type=pdf>>.
Worthington, Bruce L., et al., "Scheduling Algorithms for Modern Disk Drives", May 1994, pp. 241-251. Available at <<http://www.ece.cmu.edu/~ganger/papers/sigmetrics94.pdf>>.
Yin, Jian, et al., "Separating Agreement from Execution for Byzantine Fault Tolerant Services", Oct. 19-22, 2003, 15 pages. Available at <<http://www.cs.utexas.edu/~lorenzo/papers/sosp03.pdf>>.
U.S. Appl. No. 13/051,964, Feb. 25, 2013, Office Action.
U.S. Appl. No. 13/051,964, Aug. 27, 2013, Office Action.
U.S. Appl. No. 13/051,964, Dec. 17, 2013, Notice of Allowance.

* cited by examiner

READ-ONLY OPERATIONS PROCESSING IN A PAXOS REPLICATION SYSTEM

CROSS-REFERENCE TO RELATED APPLICATIONS

This application is a continuation of U.S. patent application Ser. No. 13/051,964 filed on Mar. 18, 2011, entitled "READ-ONLY OPERATIONS PROCESSING IN A PAXOS REPLICATION SYSTEM," which application is expressly incorporated herein by reference in its entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to run on distributed computing systems. These distributed computing systems may include databases, distributed processor arrays, or other distributed computing systems. These systems may be operated using the Paxos algorithm or protocol ("Paxos" herein). Paxos may be used to ensure that each processor or computer node in a cluster is processing data in the proper order, and that each node maintains the same state. In this manner, individual computers in a Paxos system may fail, but no operations will be lost during the failure. Each read and write operation is written to disk before it is processed. This ensures that no operations are lost, but also results in high overhead.

BRIEF SUMMARY

Embodiments described herein are directed to processing read-only operations without storing the operations persistently, determining a processing order for read-only requests, and to directing read-only requests to nodes best able to handle the requests. In one embodiment, a quorum leader receives various read-only requests. The quorum leader controls process ordering for replicas in the leader's quorum. The quorum leader determines an appropriate order for processing the read-only operations, without clock-based synchronization. The quorum leader sends the read-only request to an appropriate replica in the quorum and the replica executes the read-only request without storing the operation persistently.

In another embodiment, a quorum leader receives various read-only requests. The quorum leader controls process ordering for replicas in the leader's quorum. The quorum leader determines an appropriate order for processing the read-only operations, without clock-based synchronization. The determined order indicates an appropriate execution slot number for the read-only operation. The quorum leader adds an indication to the read-only operation indicating that the operation is to be executed no earlier than the determined execution slot number. The quorum leader also sends the read-only request and the determined execution slot number to an appropriate replica in the quorum and the replica executes the read-only request without storing the operation persistently.

In yet another embodiment, a quorum leader receives various read-only requests. The quorum leader controls process ordering for replicas in the leader's quorum. The quorum leader determines an appropriate order for processing the read-only operations, without clock-based synchronization. The quorum leader determines which replicas are best able to handle the read-only requests and sends the read-only request to a replica that is determined to be best able to handle the read-only request. The replica best able to handle the request then executes the read-only request without storing the operation persistently.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
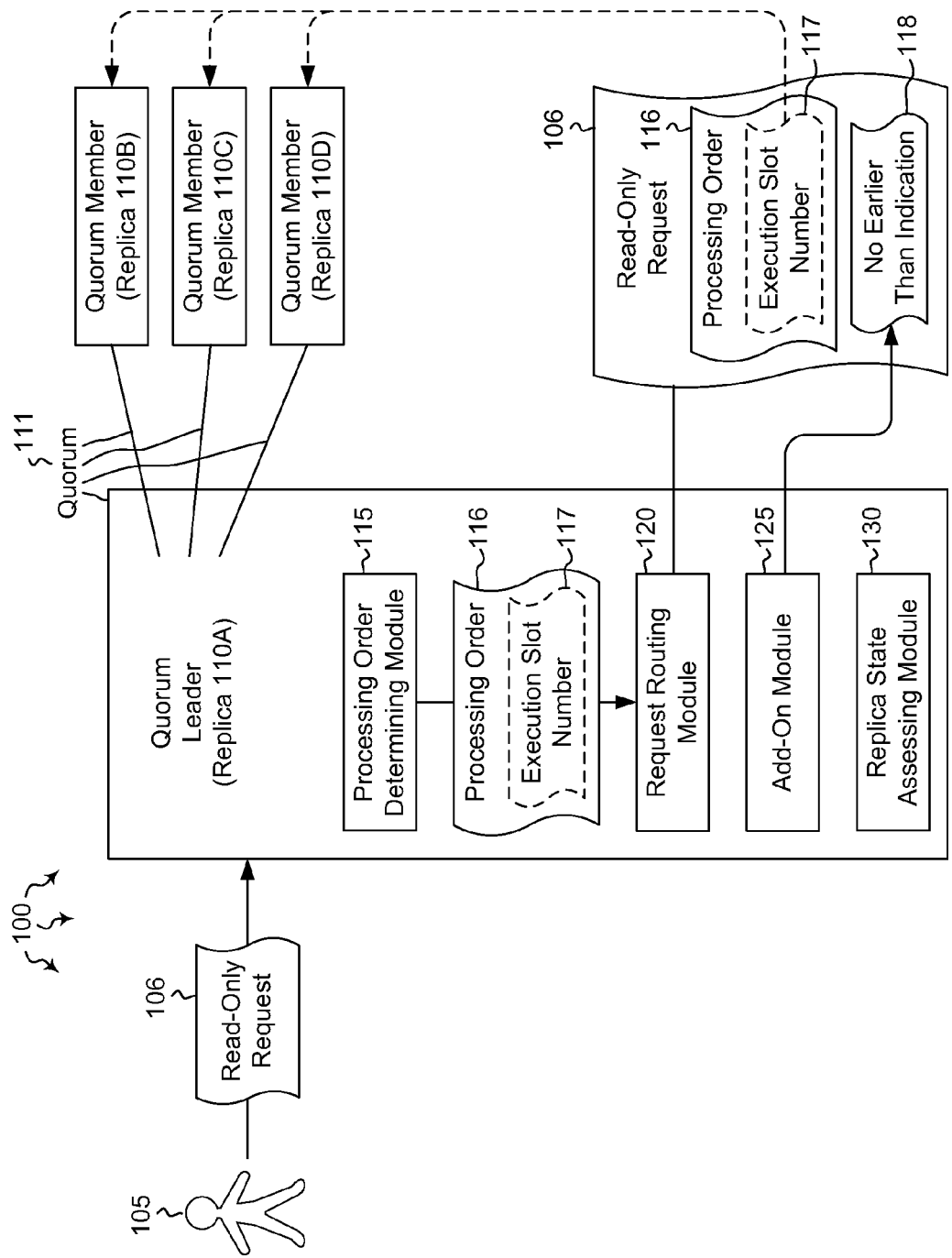
FIG. 1 illustrates a computer architecture in which embodiments of the present invention may operate including processing read-only operations without storing the operations persistently.

Embodiments described herein are directed to processing read-only operations without storing the operations persistently, determining a processing order for read-only requests, and to directing read-only requests to nodes best able to handle the requests. In one embodiment, a quorum leader receives various read-only requests. The quorum leader controls process ordering for replicas in the leader's quorum. The quorum leader determines an appropriate order for processing the read-only operations, without clock-based synchronization. The quorum leader sends the read-only request to an appropriate replica in the quorum and the replica executes the read-only request without storing the operation persistently.

In another embodiment, a quorum leader receives various read-only requests. The quorum leader controls process ordering for replicas in the leader's quorum. The quorum leader determines an appropriate order for processing the read-only operations, without clock-based synchronization. The determined order indicates an appropriate execution slot number for the read-only operation. The quorum leader adds an indication to the read-only operation indicating that the operation is to be executed no earlier than the determined execution slot number. The quorum leader also sends the read-only request and the determined execution slot number to an appropriate replica in the quorum. The replica executes the read-only request without storing the operation persistently.

In yet another embodiment, a quorum leader receives various read-only requests. The quorum leader controls process ordering for replicas in the leader's quorum. The quorum leader determines an appropriate order for processing the read-only operations, without clock-based synchronization. The quorum leader determines which replicas are best able to handle the read-only requests and sends each read-only request to a replica that is determined to be best able to handle that read-only request. The replica best able to handle the request then executes the read-only request without storing the operation persistently.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes multiple different computer systems including the members of quorum 111. The quorum may be a group or cluster of computers or processors working together to process inputs (e.g. read-only request 106 from user 105). While FIG. 1 illustrates quorum 111 as having four quorum members, the quorum may include substantially any number of quorum members. The quorum may be configured to process all types of requests including read-only requests and write requests. It should be noted that the term "write" may refer to "updating" or performing a "read-modify-write". The quorum may be configured as a replicated state machine (RSM). Replicated state machines may provide operating semantics, such that operations are fully serialized and durably committed by the time a result is returned. When implemented with the Paxos protocol, RSMs may tolerate arbitrary computer and process restarts, as well as permanent stopping faults of a minority of computers, with only weak assumptions about the underlying system.

When using an RSM, if a computation is deterministic, then it can be made fault-tolerant by running copies of it on multiple computers and feeding the same inputs in the same order to each of the replicas (e.g. replicas 110A, 110B, 110C and 110D). The Paxos protocol may be used to order the sequence of operations. Process order determining module 115 may be configured to determine an appropriate processing order for various different operation requests, including read-only request(s) 106. The determined processing order 116 may include an execution slot number 117 that indicates, for each operation, the order in which that operation is to be executed.

For example, when a quorum leader (e.g. leader 110A) receives a read request, it looks at the highest write request that is committed in sequence. A request is committed in sequence if at least half of the quorum members have logged it and have agreed to put the request in the execution slot, and the quorum leader has noted this. Thus, for example, the leader may assign slot numbers 1-5. Execution cannot occur until the operation is committed. If execution slots 1, 2, 4 and 5 are committed, but 3 is not, 2 would be the highest number committed in sequence. This determination of processing order may be performed without clock-based synchronization. That is, when determining the processing order for the data request, no synchronized (or unsynchronized) clocks are referenced. The processing order determining module 115 may also look at what operations have been previously agreed to for the old leader when a new quorum leader has been chosen. The previously agreed to operations may be incorporated into the new ordering.

Request routing module 120 may send the read-only request 106 to one or more of the quorum members for processing. In some cases, the request may be sent to a determined appropriate quorum member. For instance, replica state assessing module 130 may determine which replicas are currently available to process the data request (i.e. they are not receiving state in order to serve reads). Module 130 may determine which replicas are best able to process the request. This determination may include determining which replicas currently have a desired memory value in memory, determining which replica has a lower network or lower processor load than the other replicas, determining which replica is physically closest to the requesting client, or determining which replica can access the desired value most quickly. Many other factors may be used in determining which replica is best able to process the user's data request.

Request routing module 120 may thus route the read-only request 106 to the replica that is best able to process the request. The read-only request may include the determined processing order 116 (and the optional execution slot number), as well as a no-earlier-than indication 118. The no-earlier-than indication may be generated by add-on module 125 which is configured to add the no-earlier-than indication to the read-only request 106. The no-earlier-than indication may indicate to the replica that the data request is to be processed no earlier than a certain point (e.g. no earlier than a specified execution slot number). This provides flexibility in when the request is processed. Instead of specifying an exact processing order, read-only requests may be processed flexibly at some point, but no earlier than the point indicated in indication 118. The replica that then receives the read-only request may process the request without persistently storing the request. In this manner, the read-only request may be processed by the replica that is best able to handle the request, in a flexible manner, and without persistently storing the request. These concepts will be explained further below with regard to methods 200, 300 and 400 of FIGS. 2, 3 and 4, respectively.

Figure 2:
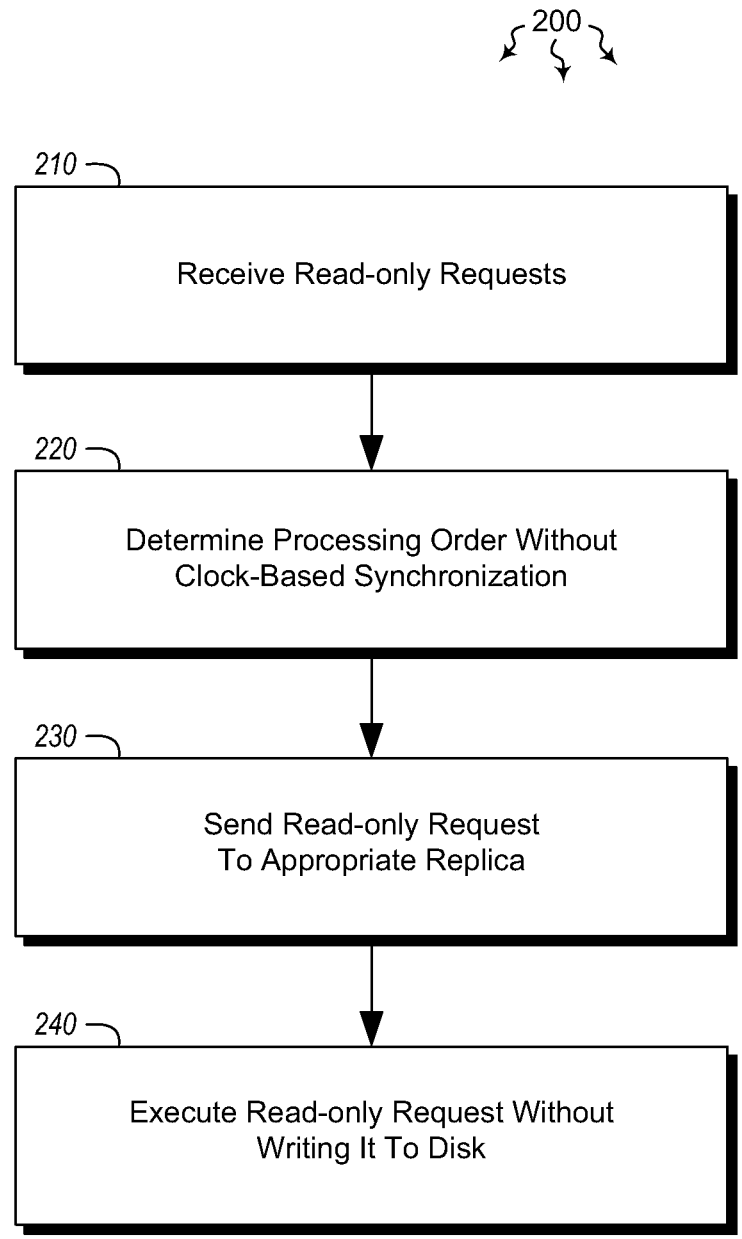
FIG. 2 illustrates a flowchart of an example method for processing read-only operations without storing the operations persistently.
Figure 3:
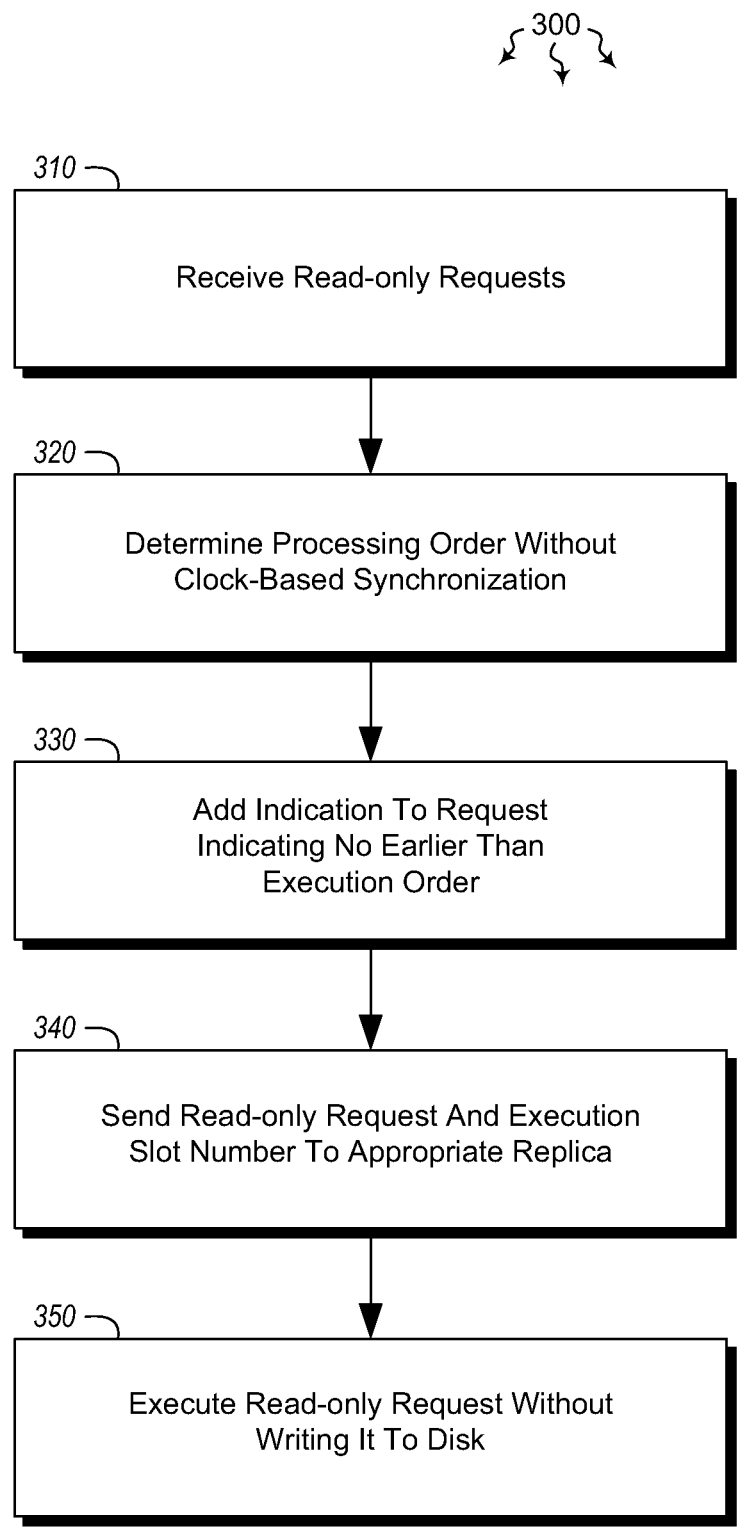
FIG. 3 illustrates a flowchart of an example method for determining a processing order for read-only requests.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for processing read-only operations without storing the operations persistently in a system that uses the Paxos protocol. The method 200 will now be described with frequent reference to the components and data of environment 100.

Method 200 includes an act of a quorum leader receiving one or more read-only requests, wherein the quorum leader controls process ordering for replicas in the quorum (act 210). For example, quorum leader 110A may receive read-only request 106 from user 105. The read-only request may be requesting that a portion of data be read and returned to the user. The quorum leader may be (at least temporarily) in charge of controlling process ordering for replicas 110B-110D in quorum 111. It will be appreciated that while four replicas are shown in FIG. 1, substantially any number of replicas may be in quorum 111. Leadership (and membership) in the quorum may change over time, with different replicas being leader at different points in time. In FIG. 1, replica 110A is the current leader of the quorum. Thus, replica 110A receives and processes requests from users.

Method 200 includes an act of determining an appropriate order for processing the read-only operations, the determination being performed without clock-based synchronization (act 220). For example, processing order determining module 115 may determine a processing order for the received read-only request(s) 106, without using clock-based synchronization in the determination. The processing order may indicate the order in which various operations are to be processed. For instance, some operations can only be performed after other operations have been completed. In other cases, the read-only option may be performed at a flexible time. In such cases, add-on module 125 may add a "no-earlier-than" indication 118 to the read-only request indicating that the request can be executed flexibly at some point, but no earlier than a specified point.

In some cases, the determined processing order 116 may further indicate an appropriate execution slot number 117 for the read-only operation 106. The determined execution slot number may be sent by the request routing module 120 to the determined appropriate replica in the quorum 111. Determining the appropriate processing order may include identifying the greater of the highest slot number that the leader has committed in sequence and the highest operation number that the leader has proposed. As explained above, a number is committed in sequence if at least half of the quorum members have logged it and have agreed to put the request in the execution slot. In one example, the leader may assign slot numbers 1-3. Execution cannot occur until the operation is committed. If execution slots 1 and 3 are committed, but 2 is not, 1 would be the highest number committed in sequence. Thus, the highest number committed in sequence may be used in determining an appropriate execution slot number 117. Additionally or alternatively, the highest number that the previous leader has proposed may be used to determine an appropriate execution slot number.

In some cases, determining an appropriate order for processing the read-only operations may identify and implement various disk-efficiency factors in the reordering determination. Thus, the processing order determining module 115 may look at factors such as where the data is stored on disk, or which data the immediately prior requests are accessing. These and other disk-efficiency factors may be used to help module 115 make its ordering decisions.

To ensure that quorum leader 110A is still the leader, it may be configured to send messages to the replicas in the quorum to determine whether the replicas have recognized a new leader. If at least half of the replicas including the leader have replied that they still recognize the leader as the leader of the quorum at the time of receiving the messages, the leader may continue receiving and processing data requests. If, on the other hand, at least half of the replicas including the leader have replied that they do not recognize the leader as the leader of the quorum, the leader may discard any pending read-only requests and begin acting as a regular quorum member. The former leader may further indicate to the user that the user is to re-send their pending read-only requests. It should be noted that, at least in some cases, a quorum may comprise less than half of the computer systems in database cluster. Separate quorums may be used for read and write requests, and requests may be processed as long as any two quorums intersect.

Method 200 includes an act of sending the read-only request to a determined appropriate replica in the quorum (act 230). For example, request routing module 120 may send read-only request 106 to an appropriate replica (e.g. 110B, 110C or 110D). The replica may be determined by the replica state assessing module 130 to be the replica that is best able to handle the request. This will be explained in greater detail with regard to FIG. 4. The leader may be configured to continually and dynamically determine which replicas are best able to handle the read-only requests and may send the read-only requests to those replicas.

Method 200 includes an act of executing the read-only request at the determined appropriate replica without storing the operation persistently (act 240). For example, the read-only request may be processed by any one of the nodes in the quorum 111, and may be performed without storing the operation persistently. The read-only request will be executed according to the processing order determined in act 220. If, for instance, the leader 110A determined that replica 110C was to be used to process the read-only request, the request would be sent to replica 110C. Replica 110C would then perform the read-only operation and send the results to computer user 105. In this manner, a read-only request may be executed on a specifically and dynamically chosen replica, in a Paxos system, without persistently storing the data request.

FIG. 3 illustrates a flowchart of a method 300 for determining a processing order for read-only requests. The method 300 will now be described with frequent reference to the components and data of environment 100.

Method 300 includes an act of a quorum leader receiving one or more read-only requests, wherein the quorum leader controls process ordering for replicas in the quorum (act 310). For example, quorum leader 110A may receive read-only request 106 from user 105. The quorum leader may be configured to receive and process all types of requests from the user including read-only requests, write requests or read/write requests.

Method 300 further includes an act of determining an appropriate order for processing the read-only operations, wherein the determined order indicates an appropriate execution slot number for the read-only operation, the determination being performed without clock-based synchronization (act 320). For example, processing order determining module 115 may determine processing order 116 for read-only request(s) 106. The processing order may indicate an execution slot number 117 for the operations. As mentioned above, module 115 may make the ordering determination without referencing a synchronous or other clock.

The current leader 110A may send messages to the other replicas in the quorum to determine whether the replicas have recognized a new leader. If at least half of the replicas including the leader have replied that the replicas still recognize the leader as the leader of the quorum, the leader will continue processing read-only requests. If at least half of the replicas including the leader have replied that they do not recognize the leader as the leader of the quorum, the read-only request may be discarded, and the leader may indicate to the user that the user is to re-send the read-only request. Add-on module 125 may add a no-earlier-than indication 118 to the read-only operation 106 indicating that the operation is to be executed no earlier than the determined execution slot number 118 (act 330). This type of execution allows multiple different data requests to be ordered in a flexible manner so that at least some of the data requests can be processed when it's most convenient, and not according to a strict process ordering.

Method 300 includes an act of sending the read-only request and the determined execution slot number to a determined appropriate replica in the quorum (act 340). For example, request routing module 120 may route read-only request 106 to whichever quorum replica was determined to be appropriate. The replica that receives this request (any of replicas 110A-D) may execute the request without storing the operation persistently (act 350). The read-only request will be executed according to the processing order determined in act 320. In this manner, read-only operations may be flexibly processed when tagged with a no-earlier-than indication. Moreover, the request(s) may be processed without storing the operations persistently, even when using the Paxos protocol.

Figure 4:
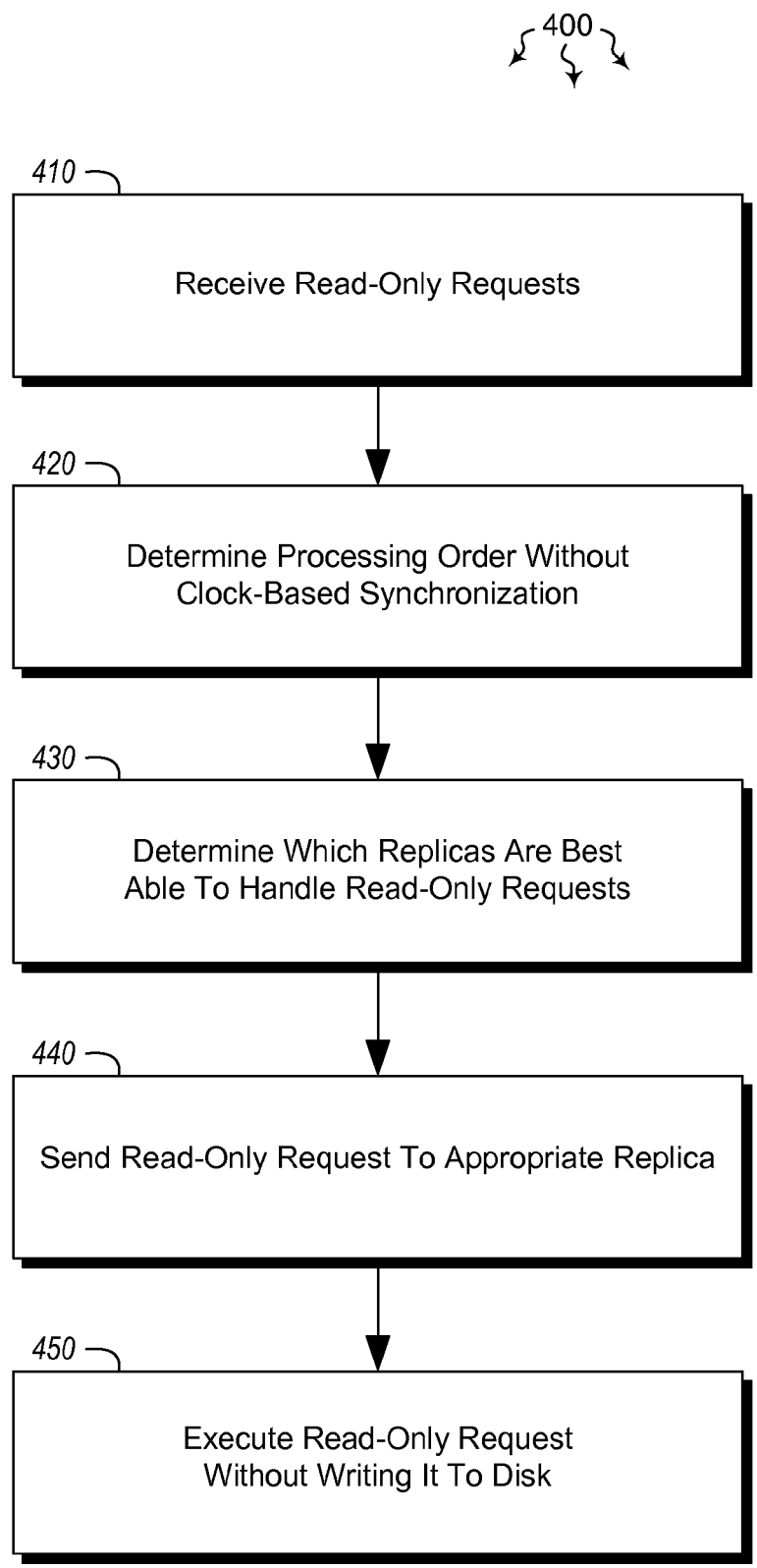
FIG. 4 illustrates a flowchart of an example method for directing read-only requests to nodes best able to handle the requests.

FIG. 4 illustrates a flowchart of a method 400 for directing read-only requests to nodes best able to handle the requests. The method 400 will now be described with frequent reference to the components and data of environment 100.

Method 400 includes an act of a quorum leader receiving one or more read-only requests from a requesting client, wherein the quorum leader controls process ordering for replicas in the quorum (act 410). For example, quorum leader 110A may receive read-only request(s) 106 from client 105. Processing order determining module 115 may determine an appropriate order 116 for processing the read-only operations (act 420). The determination may be performed without clock-based synchronization. Replica state assessing module 130 may determine which replicas are best able to handle the read-only requests (act 430).

For example, determining which replicas are best able to handle the read-only requests may include determining which replicas are currently writing data to disk. Replicas that are currently writing data to disk (or are otherwise using their processing resources) may not be the nodes that are best able to process the data requests. The determination may also look at which replicas currently have a desired memory value in memory. If that desired value is already loaded, it may save time and may indicate that that node is the optimal choice for processing the request. The determination may further look at which replica has a lower network load or which replica has a lower processor load than the other replicas. The node with the lowest load in each area (or at least most areas) may be selected as the best node. Still further, the determination may look at which replica is physically closest to the requesting client. Reducing distance may reduce communication and overall processing time, thus attributing to the node's overall desirability. While the above examples are provided, one skilled in the art will appreciate that many different factors (alone or in combination) may be used in determining which node is best able to process an incoming data request.

Method 400 also includes an act of sending the read-only request to a replica that is determined to be best able to handle the read-only request (e.g. one of replicas 110A-D) (act 440). The replica that is selected to process the read-only request may execute the request without writing the request to disk (act 450). The read-only request will be executed according to the processing order determined in act 420. In this manner, read-only requests may be processed on the quorum member that is best able to handle the request. Moreover, the read-only request may be processed without persistently storing the request, even in a system that utilizes the Paxos protocol.

In some cases, methods 300 and 400 may be combined, such that a no-earlier-than indication may be added to the read-only operation indicating that the operation is to be executed no earlier than a determined execution slot number. The read-only request may then be executed at the replica determined to be best able to handle the read-only request, according to the no-earlier-than execution order and without persistently storing the read-only request.

Accordingly, methods, systems and computer program products are provided which process read-only operations without storing the operations persistently. Moreover, methods, systems and computer program products are provided which determine a flexible processing order for read-only requests and direct read-only requests to nodes best able to handle the requests.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising at least one quorum leader for managing replication and storage of data by processing read-only operations, without storing the operations persistently, in a distributed computer system, the distributed computer system being operated under a Paxos-type protocol and including the quorum leader and one or more quorum members, the system comprising:

one or more processors;

one or more computer-readable storage media coupled to the one or more processors, and having stored thereon computer-executable instructions that, when executed by the one or more processors, causes the computing system to perform the following:

the quorum leader receiving a read-only request;

the quorum leader determining an appropriate order defined by a determined execution slot for processing the read-only request;

the quorum leader adding a no-earlier-than indication to the operation for the read-only request indicating that the operation is to be executed no earlier than the determined execution slot number;

the quorum leader selecting one of the quorum members to serve as an appropriate replica which is determined to process the received read-only request; and the quorum leader sending the read-only request and the determined execution slot number and no-earlier-than indication to the determined appropriate replica causing the determined appropriate replica to execute the read-only request by processing a read-only operation of the request, based on the determined execution slot number and the no-earlier-than indication, at an execution slot that is later than the determined execution slot number, and without storing the operation persistently.

2. The system of claim 1, the one or more computer-readable storage media further comprising computer-executable instructions that are executable by the one or more processors to cause the computing system to send the results of the executed read-only request to a computer user.

3. The system of claim 1, wherein the determined processing order further indicates an appropriate execution slot number for the read-only operation.

4. The system of claim 3, wherein determining the appropriate processing order comprises identifying the greater of the highest slot number that the quorum leader has committed in sequence and the highest operation number that a previous quorum leader proposed.

5. The system of claim 1, the one or more computer-readable storage media further comprising computer-executable instructions that are executable by the one or more processors to cause the computing system to send a message to the quorum members to determine whether the quorum members have recognized a new leader.

6. The system of claim 5, the one or more computer-readable storage media further comprising computer-executable instructions that are executable by the one or more processors to cause the computing system to determine that at least half of the quorum members, including the quorum leader, have replied that the quorum members still recognize the quorum leader as the leader of the quorum.

7. The system of claim 5, the one or more computer-readable storage media further comprising computer-executable instructions that are executable by the one or more processors to cause the computing system to perform the following:

determine that the quorum members do not recognize the quorum leader as the leader of the quorum;

discard the read-only request; and indicate to the user that the user is to re-send the read-only request to a new quorum leader.

8. The system of claim 1, wherein determining an appropriate order for processing the read-only operations identifies and implements disk-efficiency factors.

9. The system of claim 1, wherein the quorum leader determines several quorum members that are best able to handle the read-only request and sends the read-only request to those quorum members.

10. A method, implemented at a computer system that includes one or more processors, for managing replication and storage of data by processing read-only operations, without storing the operations persistently, the method comprising:

receiving a read-only request;

determining an appropriate order defined by a determined execution slot for processing an operation for the read-only request;

adding a no-earlier-than indication to the operation for the read-only request indicating that the operation is to be executed no earlier than the determined execution slot;

determining one of the plurality of quorum members to serve as an appropriate replica which is determined to be best able to process the received read-only request;

sending the read-only request and the determined execution slot and no-earlier-than indication to the appropriate replica, causing the read-only request to be executed at the determined appropriate replica by processing the operation for the read-only request, based on the slot and the no-earlier-than indication, at an execution slot that is later than the determined execution slot number, and without storing the operation persistently.

11. The method of claim 10, the one or more computer-readable storage media further comprising computer-executable instructions that are executable by the one or more processors to cause the quorum leader to a message to the quorum members determine whether a new quorum leader has been recognized.

12. The method of claim 11, the one or more computer-readable storage media further comprising computer-executable instructions that are executable by the one or more processors to cause the computing system to determine that at least half of the quorum members including the quorum leader have replied that the quorum members still recognize the quorum leader as the leader of the quorum.

13. The method of claim 11, the one or more computer-readable storage media further comprising computer-executable instructions that are executable by the one or more processors to cause the computing system to:

determine that the quorum members do not recognize the quorum leader as the leader of the quorum;

discard the read-only request; and indicate to the user that the user is to re-send the read-only request to a newly recognized quorum leader.

14. A computing system comprising at least one quorum leader for managing replication and storage of data by processing read-only operations, without storing the operations persistently, in a distributed computer system, the distributed computer system being operated under a Paxos-type protocol and including the quorum leader and one or more quorum members, the system comprising:

one or more processors; and one or more computer-readable storage media coupled to the one or more processors, and having stored thereon computer-executable instructions that, when executed by the one or more processors, causes the computing system to perform the following:

the quorum leader receiving a read-only request;

the quorum leader determining an appropriate order defined by a determined execution slot for processing an operation for the read-only request;

the quorum leader adding a no-earlier-than indication to the operation for the read-only request indicating that the operation is to be executed no earlier than the determined execution slot, wherein the operation is executed after the operation is committed, and wherein the operation is committed when at least half of the quorum members have both logged the operation and agreed to put the read-only request in the execution slot;

the quorum leader determining one of the quorum members to serve as an appropriate replica which is determined to be best able to process the received read-only request;

the quorum leader then sending messages to the quorum members to determine whether the quorum members have recognized a new quorum leader, and if not, sending the read-only request and the determined execution slot and no-earlier-than indication to the appropriate replica, and then executing the read-only request at the determined appropriate replica by processing the read-only operation of the request, based on the slot and the no-earlier-than indication, at an execution slot that is later than the determined execution slot number, and without storing the operation persistently; and if so, discarding any pending read-only request and the quorum leader then acting as a regular quorum member.

15. The system of claim 14, wherein determining which quorum member is best able to handle the read-only request comprises determining which quorum members are currently writing data to disk.

16. The system of claim 14, wherein determining which quorum member is best able to handle the read-only request comprises determining which quorum members currently have a desired memory value in memory.

17. The system of claim 14, wherein determining which quorum members is best able to handle the read-only request comprises determining which quorum member has at least one of a lower network and a lower processor load than the other replicas.

18. The method of claim 10, wherein the operation is executed after the operation is committed, and wherein the operation is committed when at least half of the quorum members have both logged the operation and agreed to put the read-only request in the execution slot.

* * * * *